United States Patent
Summey et al.

(10) Patent No.: US 10,283,276 B2
(45) Date of Patent: May 7, 2019

(54) METHOD OF MANUFACTURING A CAPACITOR ARRAY

(71) Applicant: KEMET Electronics Corporation, Simpsonville, SC (US)

(72) Inventors: Brandon Summey, Simpsonville, SC (US); Peter Blais, Simpsonville, SC (US); Yanming Liu, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 189 days.

(21) Appl. No.: 15/443,787

(22) Filed: Feb. 27, 2017

(65) Prior Publication Data

US 2017/0178818 A1    Jun. 22, 2017

Related U.S. Application Data (62) Division of application No. 14/180,842, filed on Feb. 14, 2014, now Pat. No. 9,741,494.

(51) Int. Cl.
| | |
|---|---|
| *H01G 4/38* | (2006.01) |
| *H01G 4/005* | (2006.01) |
| *H01G 9/00* | (2006.01) |
| *H01G 9/055* | (2006.01) |
| *H01G 4/008* | (2006.01) |

(52) U.S. Cl.
CPC .............. *H01G 4/38* (2013.01); *H01G 4/005* (2013.01); *H01G 4/008* (2013.01); *H01G 9/0029* (2013.01); *H01G 9/055* (2013.01); *Y10T 29/302* (2015.01); *Y10T 29/43* (2015.01)

(58) Field of Classification Search
CPC .......... H01G 9/00; H01G 9/055; H01G 9/058; H01G 4/005; H01G 4/008; H01G 4/38; H01G 9/0029; Y10T 29/302; Y10T 29/43
See application file for complete search history.

(56) References Cited

U.S. PATENT DOCUMENTS

| | | | |
|---|---|---|---|
| 3,553,544 A * | 1/1971 | Puppolo et al. | H01G 2/08 361/272 |
| 3,781,976 A * | 1/1974 | Tomiwa | H01G 9/0029 29/25.03 |
| 4,090,231 A | 5/1978 | Millard et al. | |

(Continued)

FOREIGN PATENT DOCUMENTS

| | | |
|---|---|---|
| JP | 2003-124069 | 4/2003 |
| JP | 2008-282835 | 11/2008 |

(Continued)

*Primary Examiner* — Carl J Arbes
(74) *Attorney, Agent, or Firm* — Joseph T. Guy; Patent Filing Specialist, Inc.

(57) ABSTRACT

An improved array of capacitors is provided wherein the improvement includes improved electrical properties and improved packing density. The array has an anode foil and a dielectric on a surface of the anode foil. A multiplicity of areas are defined on the dielectric wherein each area is circumvented by an isolation material and the isolation material extends through the dielectric. A conductive cathode layer in each area forms a capacitive couple. At least one substrate vacancy is in the anode foil and the substrate vacancy electrically isolates adjacent anodes of adjacent capacitive couples. A carrier film is attached to the capacitive couples.

11 Claims, 9 Drawing Sheets

(56) References Cited

U.S. PATENT DOCUMENTS

| | | | |
|---|---|---|---|
| 4,188,706 A | 2/1980 | Millard | |
| 4,494,299 A * | 1/1985 | Franklin | H01G 9/0029 29/25.03 |
| 4,599,788 A | 7/1986 | Love | |
| 4,805,074 A * | 2/1989 | Harakawa | H01G 9/0029 29/25.03 |
| 5,740,010 A | 4/1998 | Devoe et al. | |
| 5,926,363 A | 7/1999 | Kuriyama | |
| 6,040,229 A | 3/2000 | Kuriyama | |
| 6,293,974 B1 * | 9/2001 | Kobatake | H01G 9/0029 29/25.03 |
| 6,324,048 B1 | 11/2001 | Liu | |
| 6,368,363 B1 * | 4/2002 | Kobatake | H01G 9/0029 29/25.03 |
| 6,785,147 B2 | 8/2004 | Miki et al. | |
| 7,056,800 B2 | 6/2006 | Croswell et al. | |
| 7,057,878 B2 | 6/2006 | Vierow et al. | |
| 7,180,724 B2 | 2/2007 | Mosley | |
| 7,280,343 B1 | 10/2007 | Zednicke et al. | |
| 7,331,999 B2 * | 2/2008 | Kobayashi | H01G 9/0029 257/E21.008 |
| 7,745,281 B2 | 6/2010 | Prymak et al. | |
| 8,199,462 B2 | 6/2012 | Zednicek et al. | |
| 2002/0075833 A1 | 6/2002 | Dick et al. | |
| 2005/0141189 A1 | 8/2005 | Yamasaki | |
| 2005/0213286 A1 | 9/2005 | Michel et al. | |
| 2006/0256507 A1 | 11/2006 | Yoshida | |
| 2008/0216296 A1 | 9/2008 | Prymak et al. | |
| 2009/0290290 A1 | 11/2009 | Osako | |
| 2010/0020473 A1 | 1/2010 | Prymak | |
| 2012/0117771 A1 | 5/2012 | Dattaguru | |

FOREIGN PATENT DOCUMENTS

| | | |
|---|---|---|
| JP | 2009-059881 | 3/2009 |
| JP | 2009-267287 | 11/2009 |
| JP | 2010-186796 | 8/2010 |
| JP | 4986387 B2 * | 7/2012 |
| WO | WO 2008/109283 | 9/2008 |

* cited by examiner

METHOD OF MANUFACTURING A CAPACITOR ARRAY

CROSS-REFERENCE TO RELATED APPLICATIONS

The present invention claims priority to U.S. Provisional Application No. 61/764,667 filed Feb. 14, 2013, which is incorporated herein by reference.

BACKGROUND

The present invention is related to an improvement in capacitor arrays and to an improved method for making capacitor arrays.

Miniaturization is an ongoing desire in the electronics industry. This desire is driven by consumer demands for smaller, more functional, devices with decreased size and weight. This demand is contrary to the demand for decreased cost.

A perplexing problem, which is inherent in miniaturization, is the increase in parasitic electrical characteristics that plague circuitry. Even as components themselves can be improved there are physical barriers when these components are attached to a circuit board that negate some of the electrical improvements provided by the discrete components themselves. Related specifically to the issues of parasitic electrical characteristics, as discrete components, capacitors are typically attached individually to a circuit or package and when attached they require two things; space and electrical connection. As components become smaller the space between them to account for handling capabilities, and tolerances, to ensure they do not touch become a large percentage of the total circuit footprint. This introduces poor efficiency in space utilization and causes unwanted electrical performance. Prior teachings, such as commonly assigned U.S. Pat. No. 7,745,281, which is incorporated herein by reference, create advantages in the performance of capacitor miniaturization and manufacturing. While this art teaches methods for creating capacitors capable of being embedded, and capacitor manufacturing methods that include forming groups of discrete capacitors, it is the purpose of this invention to teach methods that utilize miniaturization techniques to create usefulness while avoiding many of the described issues that arise with discrete capacitors.

As the part size decreases, the manufacturing system necessary to place a large number of very small parts on a circuit becomes more complex as does the equipment required to bond the component to a circuit. The increased handling complexity can easily result in cost increases which could be many multiples above the material savings gained through the miniaturization. Related to the issue of cost, handling individual components requires expensive equipment. This cost is multiplied when the need to handle large quantities of components is complicated by the ever increasing desire to increase the handling speed of the components. Methods of creating arrays of capacitors have been seen in prior art and exist as industry practices as taught by Donghang in U.S. Pat. No. 6,324,048, which is incorporated herein by reference. These techniques can be used to create arrays and groups of capacitors but these capacitors are of very low capacitance. It will be the purpose of this invention to differentiate from these methods by the use of valve metal and the techniques to create close packed arrays of high capacitance capacitors.

The instant invention addresses ways of avoiding some of the prior pitfalls in miniaturization technologies, specifically those which relate to non-discrete capacitors, more specifically, but not limiting to the scope of this invention, valve metal capacitors that fit the criteria of being embeddedable or incorporated into packaging or substrate which houses more than just discrete capacitors or capacitor elements. While the term embedded in the industry, specifically capacitors, describe a capacitor that is incorporated into a substrate, typically a printed circuit board, for purposes of simplification in the present invention the term should be understood to include any capacitor device that is incorporated into another package or substrate, with or without its own packaging.

Capacitor arrays have been described in the art with the cathode component being formed within isolation areas or dams. As the demand for further miniaturization has continued the electrical parasitics in such devices has proven to be detrimental. It has now been determined that the prior art devices exhibit migration, or wicking, of cathode components under the insolation dams thereby resulting in the formation of electrical parasitics which limited the minimum size available.

The present invention provides an improved capacitor array wherein parasitic electrical characteristics can be minimized thereby allowing for closer packing. The present invention also provides an improved method for manufacturing an array of capacitors.

SUMMARY

It is the objective of this patent to provide an improved capacitor array and an improved method for manufacturing a capacitor array.

A particular feature of the invention is the ability to provide capacitors in an array thereby mitigating the manufacturing difficulties associated with handling individual capacitors.

Yet another feature of the instant invention is the minimization of parasitic electrical properties typically associated with current placement capabilities of discrete components and allowing for higher density of discrete capacitors.

These and other advantages, as will be realized, are provided in an array of capacitors. The array has an anode foil and a dielectric on a surface of the anode foil. A multiplicity of areas are defined on the dielectric wherein each area is circumvented by an isolation material and the isolation material extends through the dielectric. A conductive cathode layer in each area forms a capacitive couple. At least one substrate vacancy is in the anode foil and the substrate vacancy electrically isolates adjacent anodes of adjacent capacitive couples. A carrier film is attached to the capacitive couples.

Yet another embodiment is provided in a method of forming an array of capacitors. The method includes:
forming a dielectric layer on a surface of an anode foil;
forming areas on the anode foil wherein each area is circumvented by isolation material and the isolation material extends through the dielectric;
forming a conductive cathode layer inside each area thereby forming capacitors;
applying a carrier film to the capacitors;
removing at least a portion of the anode foil to electrically isolated adjacent capacitors.

DESCRIPTION

The present invention is directed to improved capacitors, and particularly, capacitors which can be formed in very dense arrays for singulation or to be utilized as an array of capacitors. The present invention is also directed to a method of forming an array of capacitors with decreased electrical parasitics and a higher packing density than previously considered possible.

The invention will be described with reference to the figures forming an integral, non-limiting, component of the disclosure. The figures are intended to facilitate an understanding of the invention and are not intended to limit the invention in any way. Throughout the figures various elements will be numbered accordingly.

Combining capacitors into groups is a common practice to improve electrical performance. The combination typically exists in methods to increase the electrical performance by combining discrete capacitors into commonly terminated arrays or stacks however, the limitations of the discrete capacitors in the array are not addressed. An example of combinations of capacitors is provided in U.S. Pat. No. 7,280,343, which is incorporate herein by reference, where increased electrical performance, such as increased capacitance, is achieved by using common current collecting parts to form single common anode and cathode connections. The present invention differs by creating multiple independent cathode and anode connection points, for use by the end user, as opposed to arrays or stacks of commonly terminated capacitive elements. A stack of capacitive elements typically refers to combining multiple capacitors or capacitive elements into a single common cathode and anode termination system, arranged in a pattern or in a stack, to achieved improved performance such as increased capacitance. Contrarily, distributing capacitance over a multitude of independent electrical connection points in close proximity, with no common electrical connection, as in the present invention, allows for reductions in the electrical parasitics and allows for a reduction in the amount of capacitance needed thereby further advancing efforts related to miniaturization.

Figure 1:
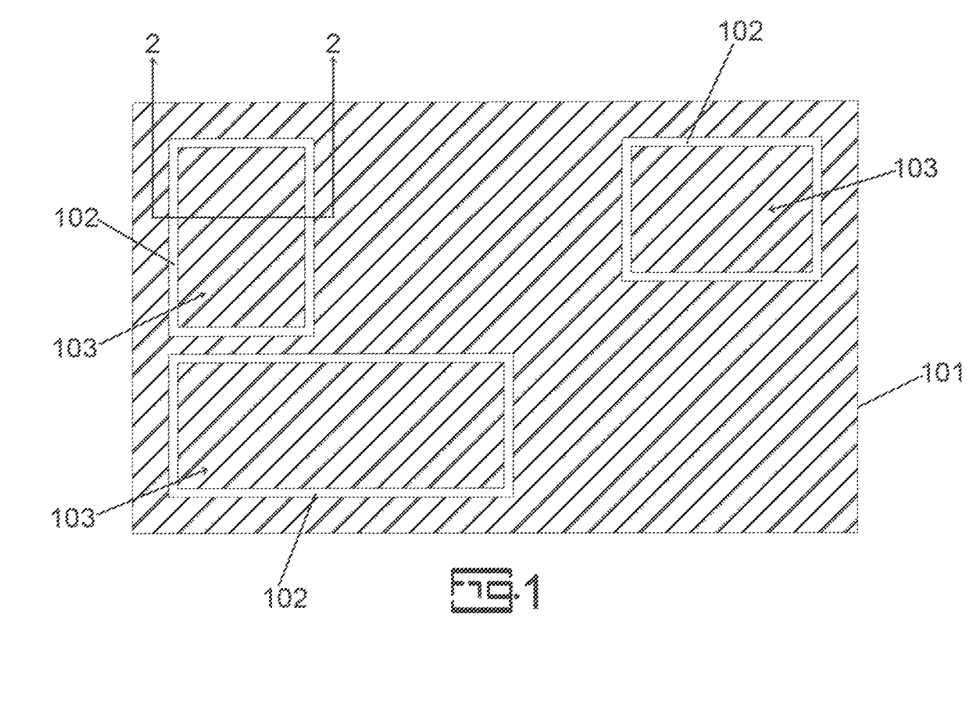
FIG. 1 is a top schematic view of an embodiment of the invention.
Figure 2:
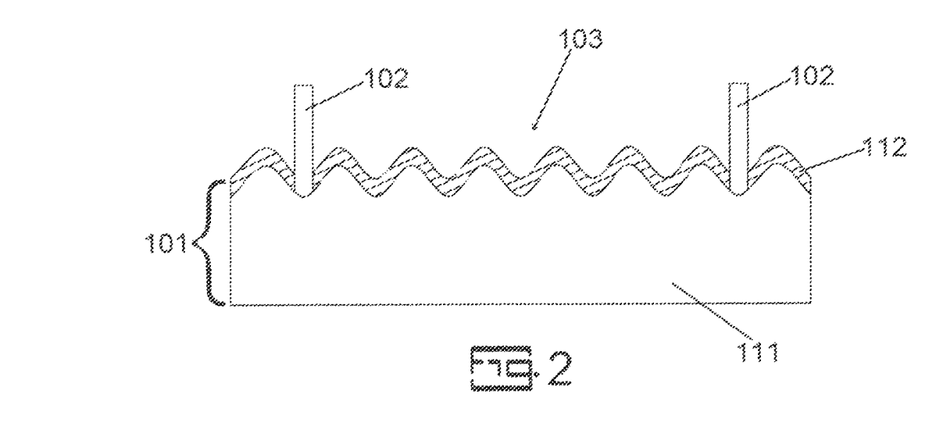
FIG. 2 is a partial cross-sectional schematic view, taken along 2-2 of FIG. 1

An embodiment of the invention is illustrated in top schematic view in FIG. 1. A portion of the embodiment of FIG. 1, taken along line 2-2, is illustrated in side schematic view in FIG. 2. A substrate, 101, comprising a conductive layer, 111, and a porous dielectric layer, 112, has formed thereon isolation material, 102, circumventing an area, 103, which will be formed into an active area after further processing. The conductive layer preferably has a roughened surface to facilitate the formation of the dielectric and to increase surface area. As illustrated in FIG. 2, the isolation material extends through the dielectric and preferably into the conductive layer to a depth sufficient to inhibit cathode material from wicking past or under the insulation material. Through diligent research it has been determined that a limitation with prior art capacitor arrays is reached when the cathode material wicks under or around the isolation material such as through the dielectric under the isolation material. Prior practice was to form the isolation material on the surface of the dielectric which was considered adequate. The phenomenon of wicking under the isolation material was previously neither considered nor realized. It was not until continued efforts to miniaturize beyond that previously considered possible with barriers that the problem of wicking was realized. The present invention allows for miniaturization beyond that previously considered possible, when forming many capacitors in a close array.

Rectangular areas are illustrated in FIG. 1 for illustrative purposes with the shape and number of areas being a design choice depending on the number of capacitors to be formed, the size required for each capacitor and the desired capacitance as well known in the art. The areas on a common substrate may be the same or different. Shapes other than rectangular are suitable for demonstration of the invention including but not limited to, circular, curved, polygonal and combinations thereof. Polygonal, such as triangular, rectangular, pentagonal, hexagonal and the like are preferred due to the increased packing density which can be achieved thereby. A mixture of shapes and sizes can be employed to achieve the highest density of capacitors with the understanding that at least enough sides are included as to form a complete boundary.

Figure 3:
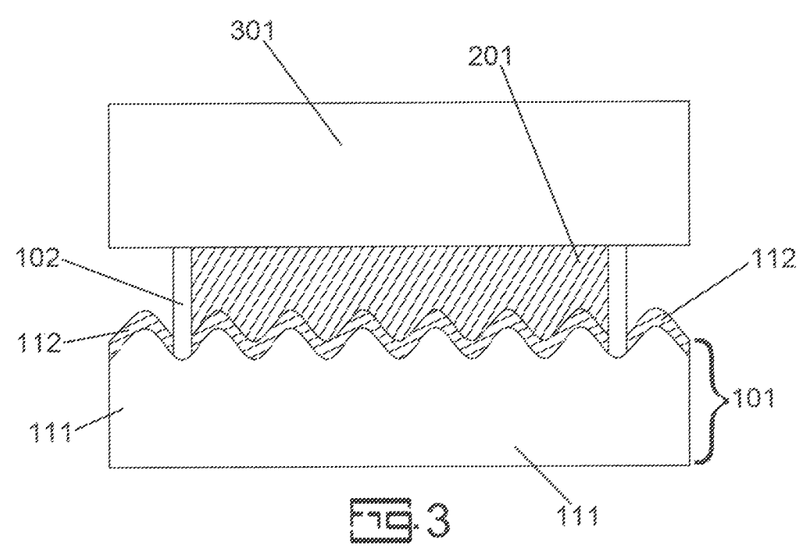
FIG. 3 is partial cross-sectional schematic view of an embodiment of the invention.

An embodiment of the invention will be described with reference to FIG. 3 wherein provided is a partial cross-sectional schematic view. In FIG. 3 the substrate, 101, and isolation material, 102, are as described in FIGS. 1 and 2. A cathode layer, 201, is formed within the area defined by the isolation material wherein the isolation material prohibits cathode material from passing through, under or around the isolation material. The cathode material is therefore separated from the conductive layer, 111, by the dielectric, 112, which forms a capacitive couple with an active area having a size and shaped defined by the area circumscribed by the isolation material.

With continued reference to FIG. 3, a carrier film, 301, is applied to the capacitor array, 104, so that it is in contact with at least a portion of each individual capacitor. The carrier film, 301, provides an anchor to each capacitor thereby forming a common structure which is stabilized by the carrier film. When the capacitors are individualized by physical and electrical isolation of both the cathode and anode they need to have a common structure so as to retain the positional integrity of the capacitor array. The carrier film also provides a foundation for handling multiple discrete capacitors. This carrier film can be applied to either side of the capacitor, in contact with the cathode layers or in contact with the anode foil, as long as it contacts at least a portion of each capacitor so as to provide a common physical layer. The carrier film can be formed in many ways and of many materials including but not limited to adhesive film, adhesive tape, release film, a sprayed liquid that forms a film, spin coating, injection molding, or static adhesion. The carrier film may also penetrate any portion of the array, including, the anode porous layer, space between isolating materials, or conductive cathode layers.

Figure 4:
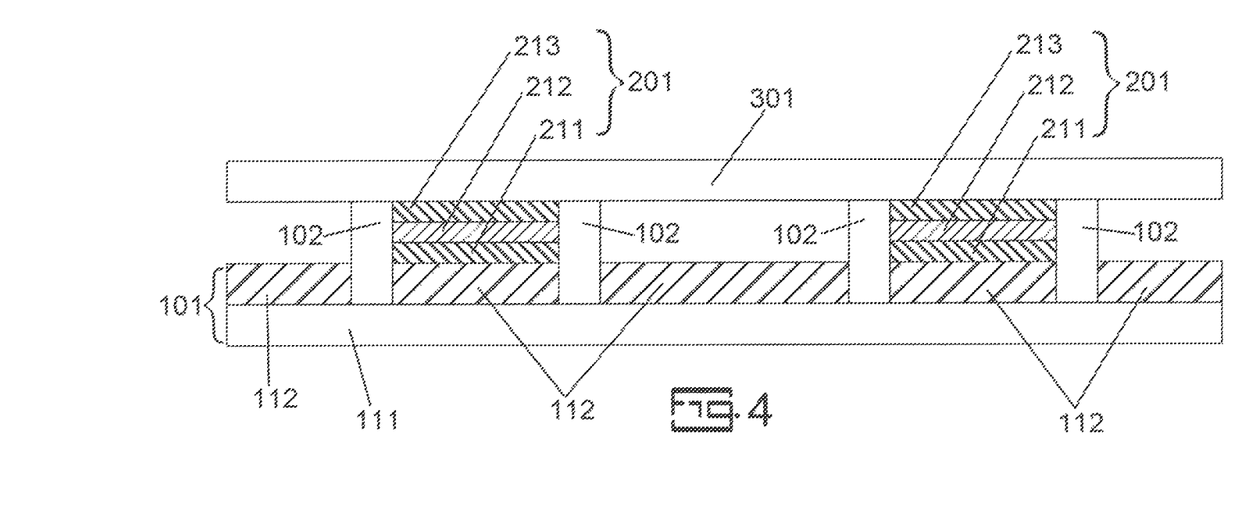
FIG. 4 is partial cross-sectional schematic view of an embodiment of the invention.

An embodiment of the invention will be further described with reference to FIG. 4 wherein provided is a partial cross-sectional schematic view illustrating two capacitive couples without limit thereto. In FIG. 4 the anode foil, 101, with the conductive layer, 111, which is the anode of the capacitive couple and dielectric layer, 112, are as discussed above as is the isolation material, 102. As a preferred but non-limiting embodiment of this present invention the conductive cathode layers, 201, are represented as three layers; a conductive polymer layer or manganese dioxide layer, 211, a carbon layer, 212, and a metal layer, 213. The carbon layer may be a carbon paint layer. The metal layer may be a metal paint layer or a plated metal layer. It is understood for the purpose of this invention that the term "paint" includes any filled system that contains a binder agent and a conductive particle. Conductive paint layers are preferred due to the specificity with which they can be applied.

Figure 5:
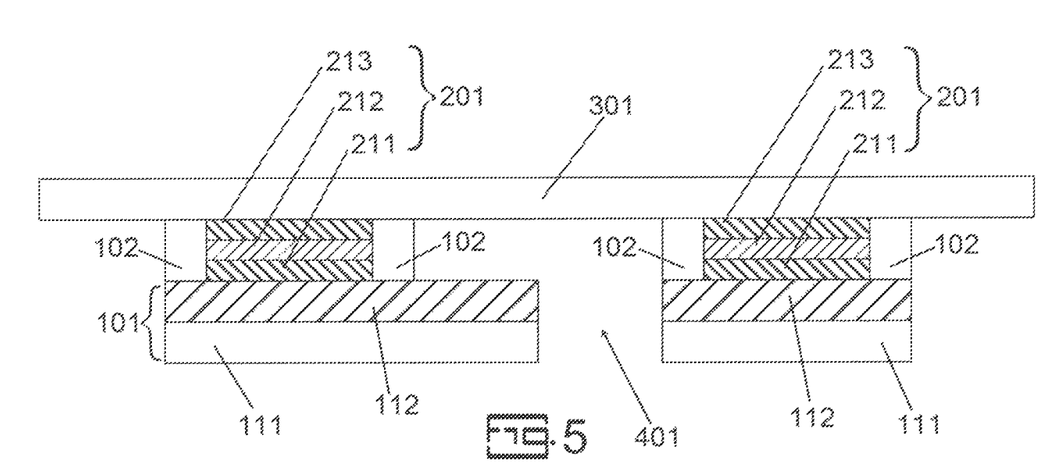
FIG. 5 is partial cross-sectional schematic view of an embodiment of the invention.

An embodiment of the invention is illustrated in schematic cross-sectional view in FIG. 5 wherein the carrier film, 301, is located on the cathode side of the array. A portion of the anode foil, 401, is removed to form a substrate vacancy, 401. The capacitive couple, 601, comprising the anode, 111, dielectric, 112 and cathode, 201, is as discussed above. The method of forming the substrate vacancy is not particularly limited with exemplary methods with suitable methods for demonstrating the invention including, laser ablation, laser cutting, mechanical cutting, dicing, chemical etching, milling, ion milling, blast polishing, or the like. The method for forming the substrate vacancy is selected based on the performance requirements needed from the capacitor array. The intent in forming the substrate vacancy is to electrically isolate the common anode portion of the capacitors. After formation of the substrate vacancy the capacitive couples are electrically individualized and the carrier film, 301, retains the array structure. Further cutting of the carrier film, 301, can be done to create smaller groups of arrayed capacitors. In one embodiment of the present invention a portion of the anode foil, 101, remains and extends beyond the boundary of the capacitive couple to function as an anode tab, 403. This anode tab, 403, can be created as a part of an individualized capacitor so as to allow for electrical attachment. In one embodiment the carrier film, 301, is a release layer. In use the individual capacitors are released on to a separate substrate and the anode tab, 403, is exposed to provide a location for electrical connection which can be on the same side of the individual devices as the cathode connection.

Figure 6:
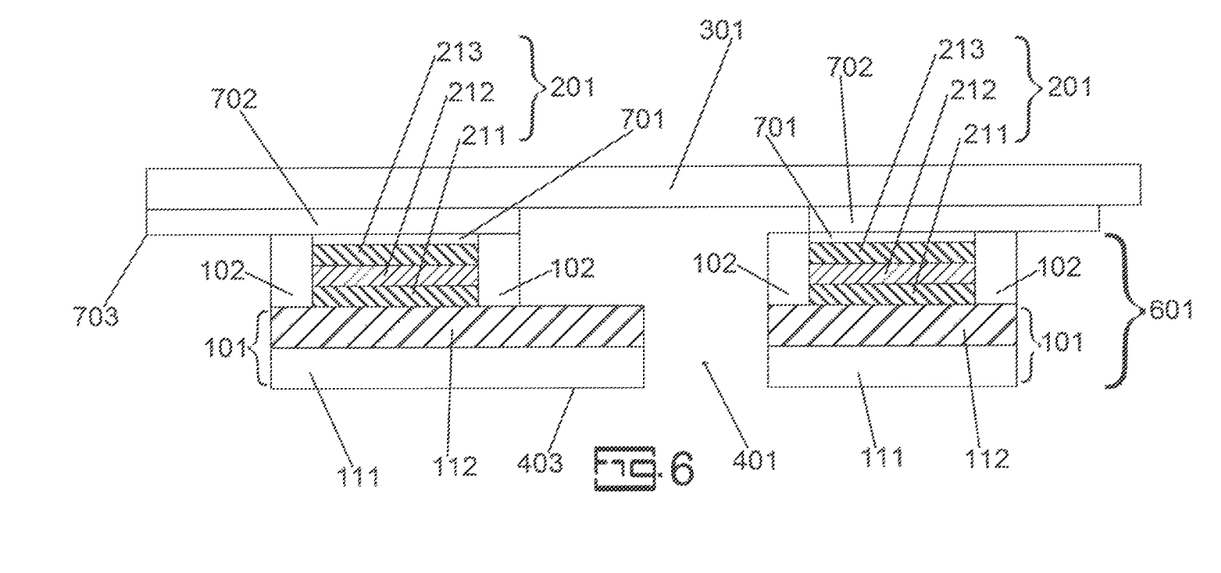
FIG. 6 is partial cross-sectional schematic view of an embodiment of the invention.

Another embodiment of the present invention is represented in FIG. 6, wherein the carrier film, 301, further comprises a cathode foil, 702, which provides a bondable surface for the capacitors. An optional cathode tab, 703, can be extended beyond the active regions as needed by application. The cathode foil, 702, can be attached to the conductive cathode layers, 201, by use of a metal filled adhesive, 701, or other attachment methods as known in the art. Other methods suitable for demonstrating the invention include, but are not limited to, a carbon filled bonding layer, adhesion by a conductive polymer, soldering, welding, or any other method to electrically or physically attach the cathode foil, 702, to the conductive cathode layers, 201. As in the case with the anode tab, 403, the cathode foil tab, 703, can be used for an electrical connection to the cathode on the same side of the capacitor as the anode thereby providing a discrete capacitor. The cathode foil may be a plated metal such as copper, silver or nickel.

Figure 7:
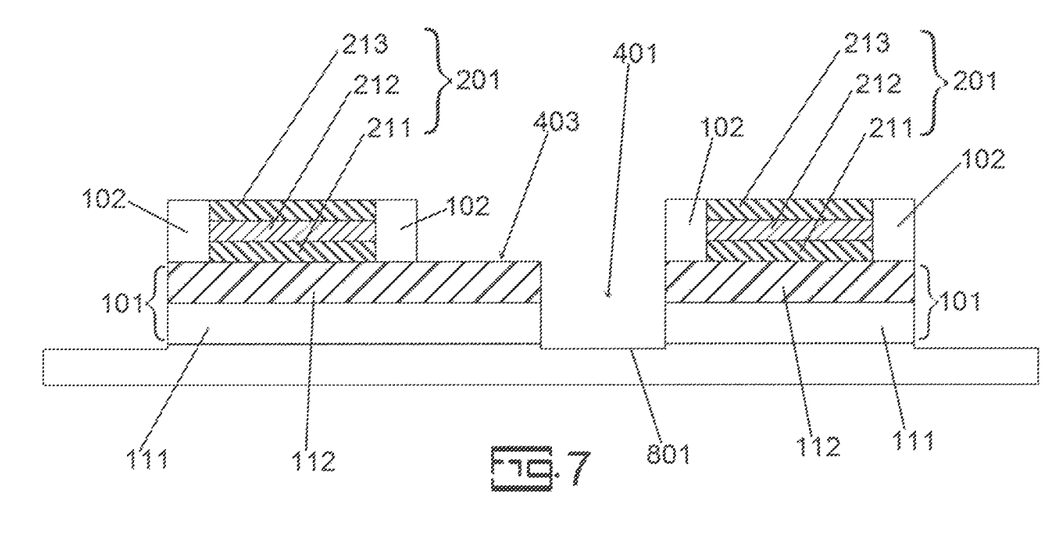
FIG. 7 is partial cross-sectional schematic view of an embodiment of the invention.

An embodiment of the invention is illustrated in FIG. 7 wherein the carrier film is applied to the anode foil. In the embodiment of FIG. 7 a portion of the carrier film, 301, can be slightly removed during the anode foil removal process. This will leave a slight indention, 801, of removed carrier film. This process will ensure that the physical connection remains with the carrier film but that the anode foil is completely isolated as to ensure that the array contains at least two individual capacitors. The indention may provide an easily severed area, such as a perforation, or to facilitate separating the primary array into smaller arrays or individual capacitors.

Figure 8:
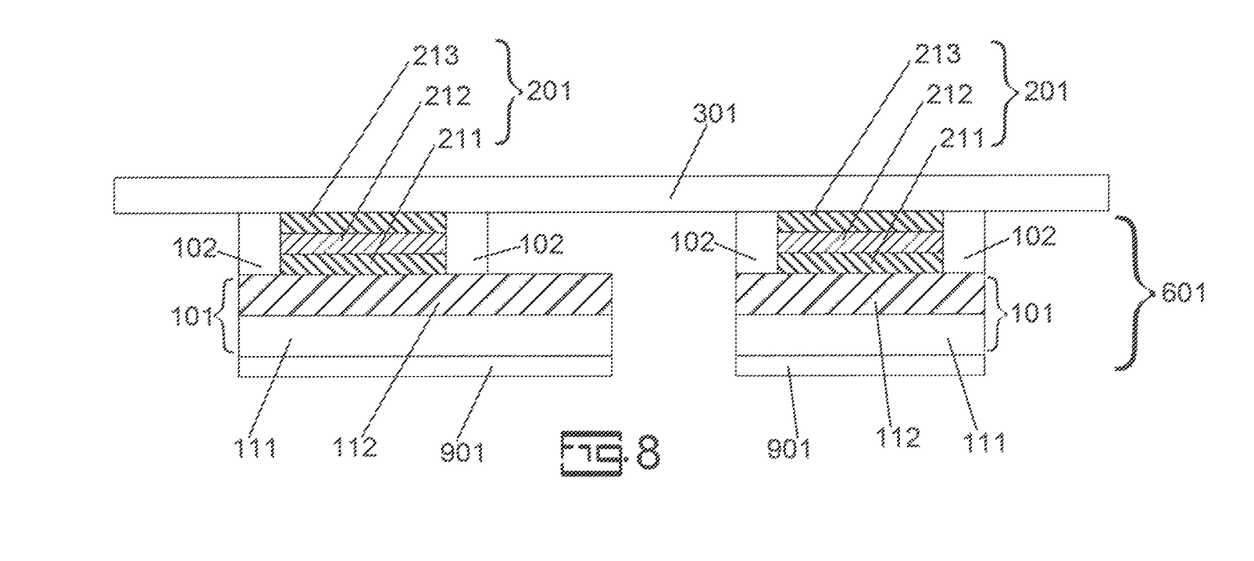
FIG. 8 is partial cross-sectional schematic view of an embodiment of the invention.

An embodiment of the invention is illustrated in cross-sectional schematic view in FIG. 8. In FIG. 8 the anode is treated to provide a bond surface, 901, to facilitate electrical connection of the capacitor to a circuit. This treatment could include but is not limited to treating at least part of at least one surface by, plating, polishing, chemical etching, welding, fusing or bonding with the proviso that the integrity of the dielectric remains.

Figure 9:
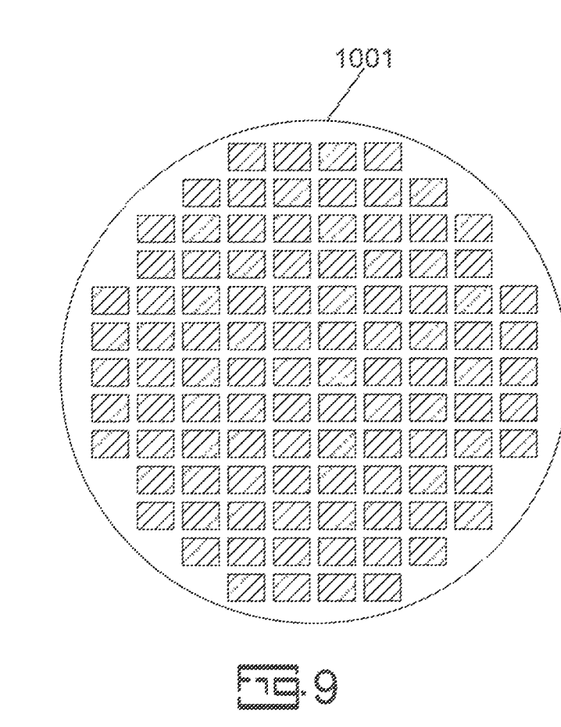
FIG. 9 is top schematic view of an embodiment of the invention.

An embodiment of the invention is illustrated in top view in FIG. 9. In FIG. 9 a primary array, 1001, of individual capacitors, 404, can be handled as an array or separated into sub-arrays, or individual capacitors. This allows a large number of capacitors to be placed into an application with a single process. Alternatively, a large number of capacitors can be transported for later use in sub-arrays or as individual capacitors with the spatial orientation maintained.

Figure 10:
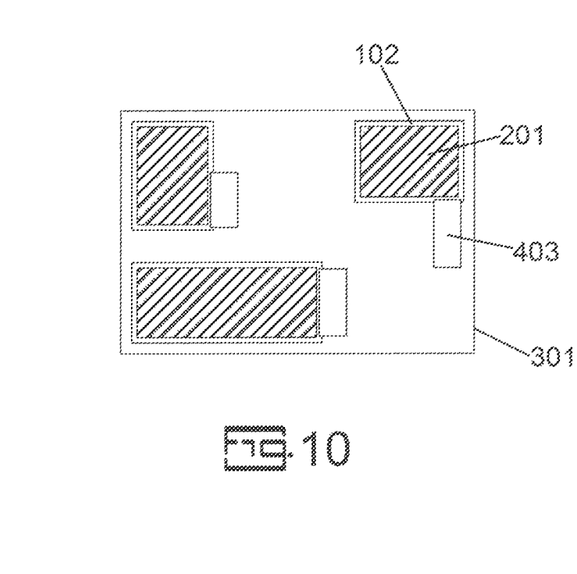
FIG. 10 is top schematic view of an embodiment of the invention.

An embodiment of the invention is illustrated as a partial top view in FIG. 10. In FIG. 10, a multiplicity of capacitors are provided wherein the cathode, 201, circumscribed by the isolation material, 102, is on a substrate, 301, with an anode tab, 403. The small array may be placed, as is, onto a circuit and electrically connected with the substrate being removed or remaining.

The roughened surface of the conductive layer can be made by additive or subtractive methods that are known in the industry, such as the electrochemical etching of the foil or the formation of powder particles of a valve metal sintered to a foil. The dielectric typically mimics, at least in part, the undulations of the roughened surface.

The cathode layer may comprise multiple layers preferably selected from layers of conductive polymer, manganese dioxide, conductive carbon ink, conductive metal ink and the like. Other materials can be used to form this conductive cathode layer including but not limited to, ionic salts, liquid electrolytes, or other suitable current conducting materials. As would be realized the isolating material restricts the location of the cathode material so as to create individual capacitive couples with a distinct cathode for each capacitive couple. It would also be understood that adjacent capacitive couples can be closely spaced allowing sufficient room to separate the individual capacitors if desired.

The method of forming the isolation material is not particularly limited herein. Methods of forming this isolating material for demonstration of the invention include but are not limited to removal of the porous layer and application of an isolating material in the removed portion, or the isolating material only present in the porous layer. It is preferred to use the removal of the porous layer in combination of adding an isolating material so as to minimize wicking of the isolating material. By minimizing this wicking additional reduction in size can be achieved.

The method of electrically connecting the anode and cathode of the capacitor array to a circuit trace are not particularly limited herein. Methods which are particularly suitable for demonstrating the invention include, but are not limited to, through hole via connection, wire-bonding, soldering, welding, braising, plating, ultrasonic welding, laser welding or the like.

The carrier film can be located at any part of the capacitor array, provided it forms a structural support to physically connect, at least temporarily, capacitors in the array. Multiple carrier films can also be used either simultaneously or sequentially and can be attached to any side of the array. Other possible uses for the carrier film can be a temporary structure for transferring the capacitor array. This can be achieve by the use of a material with releasing properties, such as but not limited to, thermal release film, pressure release film, soluble film, or other methods of removing the film once the capacitors have been transferred to the final placement. One preferred embodiment is the use of two carrier film layers. One carrier film is a double sided adhesive that bonds the capacitors in an array on one side and provides an adhesive surface for bonding the capacitors to a usable surface on the other. Once that adhesive layer is in contact with both the capacitors and the usable substrate, the second carrier film that is a release film can be detached leaving the capacitors present on the desired surface. In other embodiments the adhesive film is replaced by an adhesive applied to either the capacitors surface or the usable substrate.

The term isolating material describes any material that forms a physical, chemical, or electrical barrier. This term may be interchanged with masking material or damming material. It is understood in the industry that this isolating material can be applied by many methods, such as but not limited to deposition, transfer, screen printing, or spray. It is also understood that this material prevents the cathode materials from escaping beyond the boundaries created by this material. Part of this is accomplished by the isolating material penetrating into the porous anode layer so that wicking within the porous layer is also prevented. It is also possible, but not integral, that the isolating material resides above the porous anode layer surface as to prevent outer cathode materials from escaping beyond the boundaries. The invention has been described with particular reference to preferred embodiments without limit thereto. One of skill in the art would realize additional embodiments and improvements which are not specifically enumerated but which are within the scope of the invention as specifically set forth in the claims appended hereto.

The invention claimed is:

1. A method of forming an array of capacitors comprising:
   forming a dielectric layer on a surface of an anode foil;
   forming areas on a surface of said anode foil wherein each area of said areas is circumvented by isolation material and said isolation material extends through said dielectric;
   forming a conductive cathode layer inside each area of said areas thereby forming capacitors;
   applying a carrier film to the capacitors;
   removing at least a portion of said anode foil to electrically isolated adjacent capacitors.

2. The method of forming an array of capacitors of claim of 1 wherein said anode foil is a valve metal or oxide of a valve metal.

3. The method of forming an array of capacitors of claim of 2 further comprising treating said anode foil surface to form a roughened surface area prior to said forming said dielectric layer.

4. The method of forming an array of capacitors of claim of 1 wherein said conductive cathode layers comprise at least one of an intrinsically conductive polymer or manganese dioxide.

5. The method of forming an array of capacitors of claim of 1 wherein said conductive cathode layers comprise at least one of a carbon paint layer, a metal paint layer, a plated metal layer or a cathode foil.

6. The method of forming an array of capacitors of claim of 5 further comprising a cathode tab is formed by leaving at least a portion of said cathode foil that extends beyond the active cathode region.

7. A method of forming an array of capacitors comprising:
   forming a dielectric layer on a surface of an anode foil;
   forming areas on said anode foil wherein each area of said areas is circumvented by isolation material and said isolation material extends through said dielectric;
   forming a conductive cathode layer inside each area of said areas thereby forming capacitors;
   applying a carrier film to the capacitors;
   removing at least a portion of said anode foil to electrically isolated adjacent capacitors wherein said areas on said dielectric are formed at least in part by removal of the roughened layer.

8. A method of forming an array of capacitors comprising:
   forming a dielectric layer on a surface of an anode foil;
   forming areas on said anode foil wherein each area of said areas is circumvented by isolation material and said isolation material extends through said dielectric;
   forming a conductive cathode layer inside each area of said areas thereby forming capacitors;
   applying a carrier film to the capacitors;
   removing at least a portion of said anode foil to electrically isolated adjacent capacitors wherein said carrier film comprises at least one material selected from the group consisting of a release film, adhesive film and coated layer.

9. A method of forming an array of capacitors comprising:
   forming a dielectric layer on a surface of an anode foil;
   forming areas on said anode foil wherein each area of said areas is circumvented by isolation material and said isolation material extends through said dielectric;
   forming a conductive cathode layer inside each area of said areas thereby forming capacitors;
   applying a carrier film to the capacitors;
   removing at least a portion of said anode foil to electrically isolated adjacent capacitors further comprising forming an anode tab by leaving at least a portion of said anode foil.

10. A method of forming an array of capacitors comprising:
    forming a dielectric layer on a surface of an anode foil;
    forming areas on said anode foil wherein each area of said areas is circumvented by isolation material and said isolation material extends through said dielectric;
    forming a conductive cathode layer inside each area of said areas thereby forming capacitors;
    applying a carrier film to the capacitors;
    removing at least a portion of said anode foil to electrically isolated adjacent capacitors wherein a non-valve metal layer is applied to said anode foil.

11. A method of forming an array of capacitors comprising:
    forming a dielectric layer on a surface of an anode foil;
    forming areas on said anode foil wherein each area of said areas is circumvented by isolation material and said isolation material extends through said dielectric;
    forming a conductive cathode layer inside each area of said areas thereby forming capacitors;
    applying a carrier film to the capacitors;

removing at least a portion of said anode foil to electrically isolated adjacent capacitors wherein said array of plurality of capacitors are grouped in a plurality on said carrier film forming a primary array.

\* \* \* \* \*